US012331704B2

(12) United States Patent
Kim et al.

(10) Patent No.: US 12,331,704 B2
(45) Date of Patent: Jun. 17, 2025

(54) PRODUCTION PROCESS FOR HYDROGEN-ENRICHED SLUSH LNG FUEL AND DEVICE

(71) Applicant: Heuy Dong Kim, Daegu (KR)

(72) Inventors: Heuy Dong Kim, Daegu (KR); Jae Hyeong Lee, Daegu (KR)

(73) Assignee: Daejoo Machinery Co., Ltd., Daegu (KR)

( * ) Notice: Subject to any disclaimer, the term of this patent is extended or adjusted under 35 U.S.C. 154(b) by 0 days.

(21) Appl. No.: 18/627,439

(22) Filed: Apr. 4, 2024

(65) Prior Publication Data

US 2024/0247621 A1 Jul. 25, 2024

Related U.S. Application Data

(63) Continuation of application No. PCT/KR2022/009193, filed on Jun. 28, 2022.

(30) Foreign Application Priority Data

Oct. 5, 2021 (KR) ........................ 10-2021-0131490

(51) Int. Cl.

*F02M 21/02* (2006.01)
*F02D 19/06* (2006.01)
*F02M 21/04* (2006.01)

(52) U.S. Cl.

CPC .... *F02M 21/0227* (2013.01); *F02M 21/0206* (2013.01); *F02M 21/0215* (2013.01); *F02M 21/045* (2013.01); *F02D 19/0644* (2013.01); *F02D 19/0647* (2013.01); *F02D 19/0673* (2013.01)

(58) Field of Classification Search

CPC ............. F02M 21/045; F02M 21/0215; F02M 21/0206; F02M 21/0227

See application file for complete search history.

(56) References Cited

U.S. PATENT DOCUMENTS 7,168,464 B2 * 1/2007 Diggins .................... F17C 7/02 141/105
2007/0108096 A1 * 5/2007 Egan .................... B01J 19/1862 208/15
2010/0055629 A1 3/2010 McKnight et al.

FOREIGN PATENT DOCUMENTS

KR 10-0842365 B1 6/2008
KR 10-1309628 B1 9/2013

(Continued)

*Primary Examiner* — Kevin A Lathers

(74) *Attorney, Agent, or Firm* — NKL LAW; Jae Youn Kim

(57) ABSTRACT

Provided device for producing Hydrogen-enriched slush LNG fuel includes a vortex tube with a vortex chamber formed inside, a plurality of radial inlets installed on an outer surface of the vortex chamber through which a mixed fluid flows, a swirl generator provided inside the vortex chamber for the mixed fluid to flow inside the vortex tube and to cause a clockwise swirl motion, and a nozzle formed on the left side of the swirl generator, wherein a flow field is formed when pressure decreases to the left direction and pressure increases in the right direction from the central axis of the vortex tube, the high-temperature fluid discharges through the main tube to the right end of the vortex tube, and the low-temperature fluid discharges through the low-temperature fluid vent on the left side of the vortex tube.

6 Claims, 7 Drawing Sheets

(56) References Cited

FOREIGN PATENT DOCUMENTS

| | | | |
|---|---|---|---|
| KR | 10-1590537 | B1 | 2/2016 |
| KR | 10-1825605 | B1 | 2/2018 |
| KR | 10-2019-0048366 | A | 5/2019 |

* cited by examiner

PRODUCTION PROCESS FOR HYDROGEN-ENRICHED SLUSH LNG FUEL AND DEVICE

BACKGROUND OF THE INVENTION

Field of the Invention

The present invention relates to a production method and a device for producing Hydrogen-enriched slush LNG fuel by reforming the conventional LNG (Liquified Natural Gas) fuel and placing hydrogen ($H_2$) in slush LNG.

Description of the Related Art

With the rapid development of industrialization, fossil fuel-based machinery and engines are causing serious problems of not only resource depletion in the near future but also air pollution caused by $CO_2$ and other components emitted after combustion.

As a consequence, eco-friendly energy resources like hydrogen, electricity, wind power, solar heat, and geothermal heat are rapidly being utilized. The production cost and use efficiency of these resources are not as good as fossil fuels.

Due to the recent issues of $CO_2$ emissions as a national problem, there is a need for more research and development efforts on new and renewable energy, as well as alternative fuels.

The primary focus of these efforts is on electric batteries and hydrogen fuel cells, but they must endure significant energy losses in the stages of electricity production, accumulation, transmission, and utilization.

Additionally, there are problems with $CO_2$ emissions that are generated in hydrogen production plants, and production costs when using hydrogen fuel cells. The problems act as an obstacle to commercialization.

Moreover, if eco-friendly energy is implemented, it will lead to an extreme situation where all internal combustion engines will have to be discarded. The internal combustion engines have been developed and which have been successfully led industrialization for the past 100 years. Reforming useful conventional fossil fuels can not only increase engine performance but also reduce air pollution by reducing $CO_2$ emission and increasing combustion efficiency. So, it is possible to take great advantage of the conventional internal combustion engines.

The present inventor has invented a method and a device that can reduce $CO_2$ emissions and maximize combustion efficiency by appropriately reforming the conventional LNG fuel.

PRIOR ART DOCUMENTS

Patent Document (1): Korean Patent 10-1309628 (registered on Sep. 17, 2013)

SUMMARY OF THE INVENTION

The present invention provides a method and a device for producing Hydrogen-enriched slush LNG fuel that separates into high-temperature LNG fuel and Hydrogen-enriched slush LNG fuel in a swirl motion process in which a mixed fluid of LNG fuel and hydrogen is entered into the radial inlet of a vortex chamber.

The present invention's device for producing Hydrogen-enriched slush LNG fuel includes a vortex tube with a vortex chamber formed inside, a plurality of radial inlets installed on an outer surface of the vortex chamber through which a mixed fluid flows, a swirl generator provided inside the vortex chamber for the mixed fluid to flow inside the vortex tube and to cause a clockwise swirl motion, and a nozzle formed on the left side of the swirl generator, wherein a flow field is formed when pressure decreases to the left direction and pressure increases in the right direction from the central axis of the vortex tube, the high-temperature fluid discharges through the main tube to the right end of the vortex tube, and the low-temperature fluid discharges through the low-temperature fluid vent on the left side of the vortex tube.

In addition, a cross-sectional area of the nozzle has a convergent shape which is gradually reduced from an inlet to an outlet of the nozzle.

The plurality of radial inlets installed on the outer surface of the vortex chamber through which the mixed fluid flows is an odd number.

A cross-sectional area of the low-temperature fluid vent has an enlarged shape which is gradually expanded from an inlet to an outlet of the vent.

In the method for producing Hydrogen-enriched slush LNG fuel of the present invention, it proceeds sequentially and comprise introducing gaseous hydrogen ($H_2$) and LNG respectively into heat exchangers to secure the required initial conditions, supplying the mixed fluid to vortex tube inlets when the required initial pressure and temperature (Pi and Ti) of the mixed fluid is obtained through the heat exchangers, recovering and reusing the gas discharged to the high temperature side of the vortex tube after discharging it to the outside of a large tank, discharging the Hydrogen-enriched slush LNG fuel discharged to the bottom of the large tank into a pump installed outside the large tank, and supplying it to the fuel line for combustion of an engine.

In addition, the vortex tube is installed in the large insulated tank to separate the fluid discharged to the high temperature side from the fluid discharged to the low temperature side.

The present invention has an effect of economically producing of Hydrogen-enriched slush LNG fuel by optimizing the shape and operating conditions of the vortex tube and an effect of highly reliable on the producing of Hydrogen-enriched slush LNG fuel by allowing for the operation of the vortex tube without power and maintenance without active parts.

DETAILED DESCRIPTION OF THE EMBODIMENTS

Figure 1:
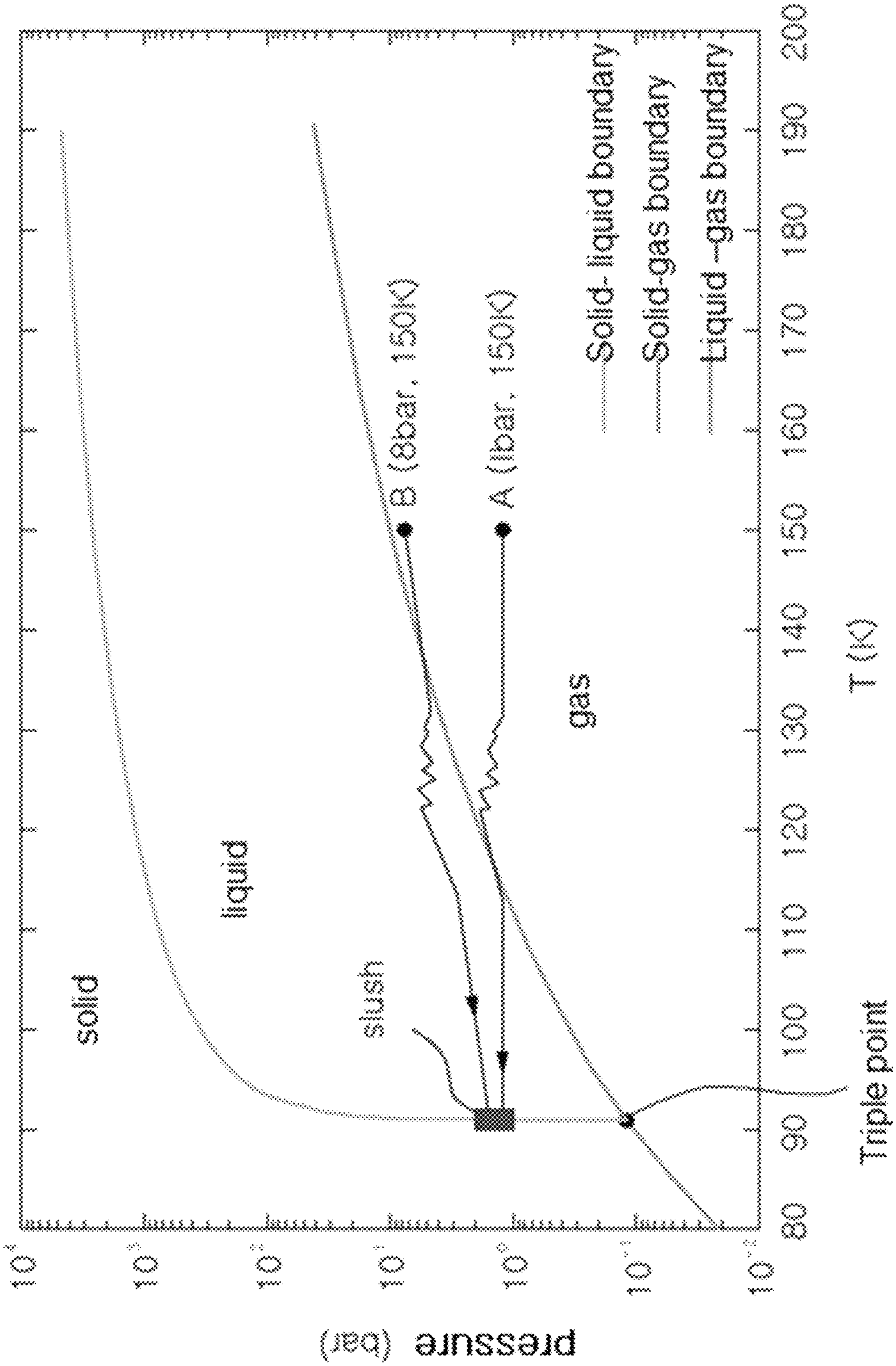
FIG. 1 shows a phase change diagram of methane ($CH_4$), which is used for LNG.

Preferred embodiments of the present invention will be described in detail with reference to the accompanying drawings. For reference, the sizes, thickness of lines, etc. of the components shown in the drawings used to describe the present invention may be somewhat exaggerated for convenience of explanation.

In addition, the terms used in the description of the present invention are defined in consideration of the functions of the present invention and may vary depending on the user or operator's intention and custom, etc. Therefore, the definition of this term should be based on the overall content of this specification.

In the description of the present invention, the terms "comprise,", "include," and "have", specify the presence of stated features, integers, steps, operations, components, and/or groups thereof, but do not preclude the presence or addition of one or more other features, integers, steps, operations, components, and/or groups thereof.

While embodiments are described herein by way of example for several embodiments, it may be implemented in various different embodiments. An objection of the embodiment is to ensure that the disclosure of the present invention is completed and to make those skilled in the art understand the spirit and scope of the present invention.

The present invention may have various modifications and alternatives, but the preferred embodiment will be described in detail in the descriptions. However, it should be understood that the embodiment is not intended to limit the present invention to a specific disclosed form and to include all changes, equivalents, and substitutes included in the technical idea of the present invention. The singular expressions used in the description may include plural expressions unless otherwise intended included. To clarify the gist of the invention, the present invention will not be described with detailed descriptions of well-known functions or configurations.

Hereinafter, preferred embodiments of the present invention will be described with reference to the drawings.

FIG. 1 shows a phase change diagram of methane ($CH_4$), which is called LNG.

The blue line on the figure represents the boundary between the solid phase and the liquid phase, the green line represents the boundary between the liquid phase and the gas phase, and the ocher line represents the boundary between the solid phase and the gas phase. • refers to a triple point where three phases coexist.

Therefore, the solid phase area is located above the blue line. The liquid phase area is located between the blue line and the green line. And the gas phase area is located is located below the green line.

Meanwhile, as indicated by the square area in the figure, LNG on the boundary between the solid phase and the liquid phase exists in the form of a two-phase mixture of the solid phase and the liquid phase. In other words, LNG is in a two-phase phase where solid particles are mixed with the liquid phase. This phase is called slush LNG.

LNG in a slush phase can be obtained by cooling the gaseous LNG at 1 bar and 150K in state A of FIG. 1 under isobaric conditions using appropriate means. By expanding and cooling the gaseous LNG in state B at 8 bar and 150K, a similar LNG product in a slush phase can be obtained.

Figure 2A:
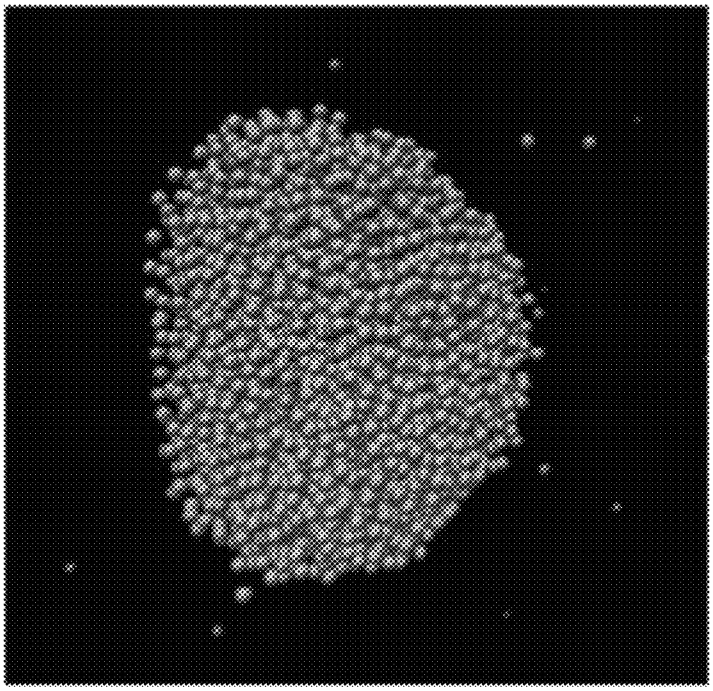
FIG. 2A shows a phase diagram of the molecular arrangement of the liquid phase of LNG.

FIG. 2A shows a phase diagram of the molecular arrangement of the liquid phase of LNG.

Figure 2B:
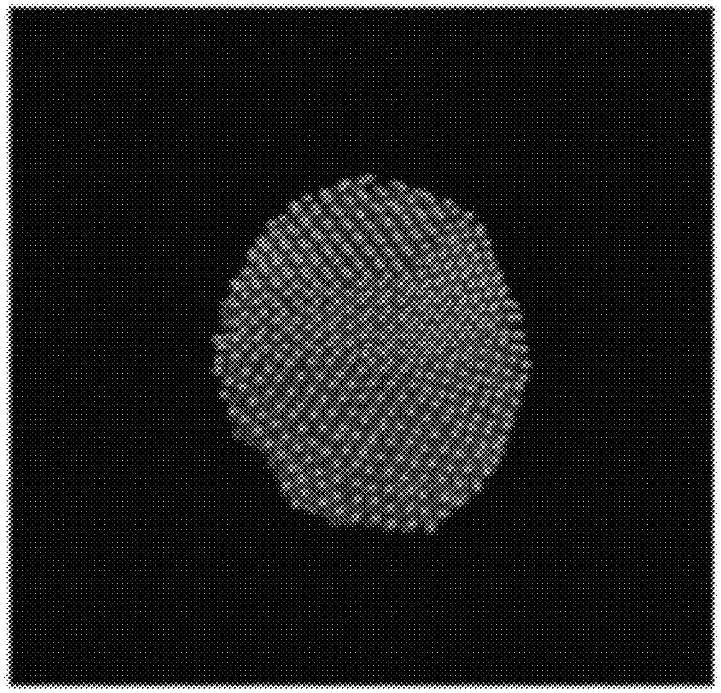
FIG. 2B shows a phase diagram of the molecular arrangement of the solid phase of LNG.

FIG. 2B shows a phase diagram of the molecular arrangement of the solid phase of LNG.

As shown, it can be seen that more porosity is formed in the liquid phase compared to the solid phase.

Figure 3:
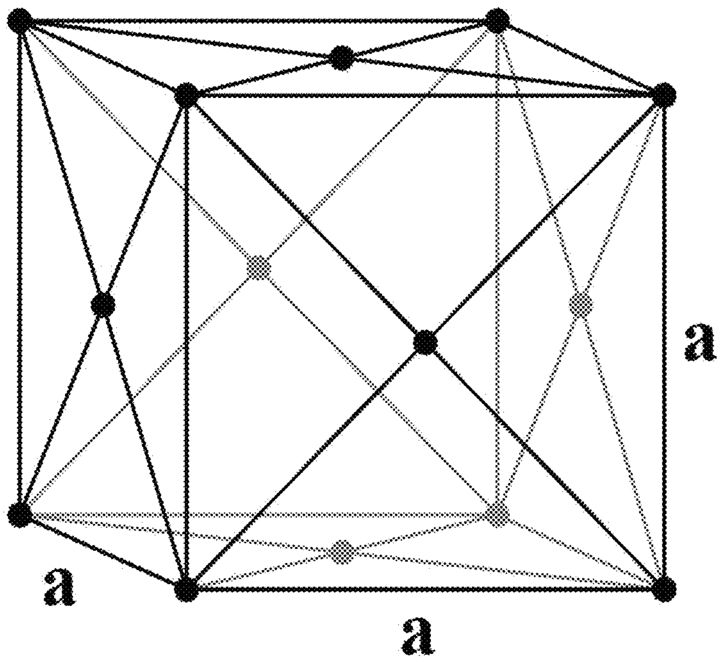
FIG. 3 shows a crystal structure diagram of a solid-phase LNG molecule.
Figure 4:
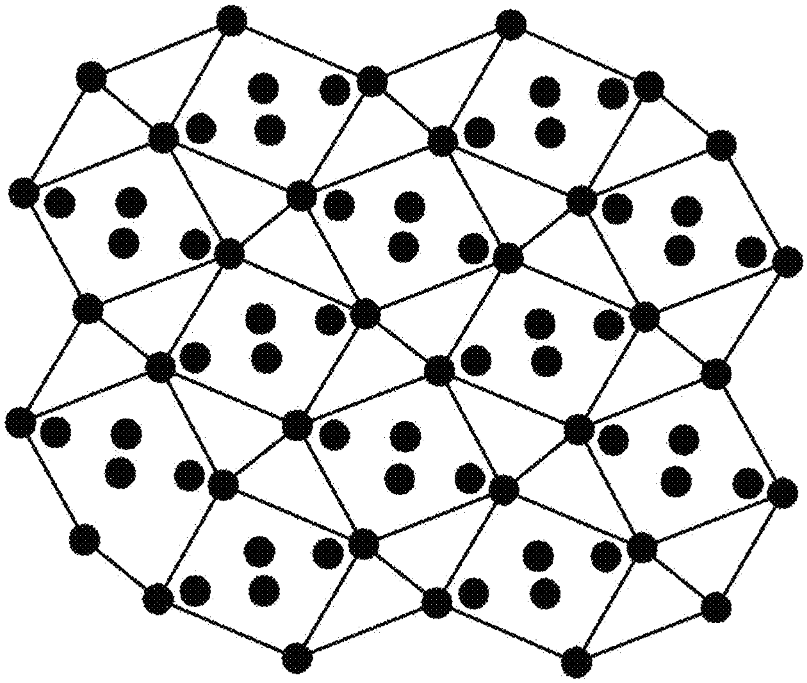
FIG. 4 shows a phase diagram showing the presence of hydrogen ($H_2$) in slush LNG fuel.
Figure 5:
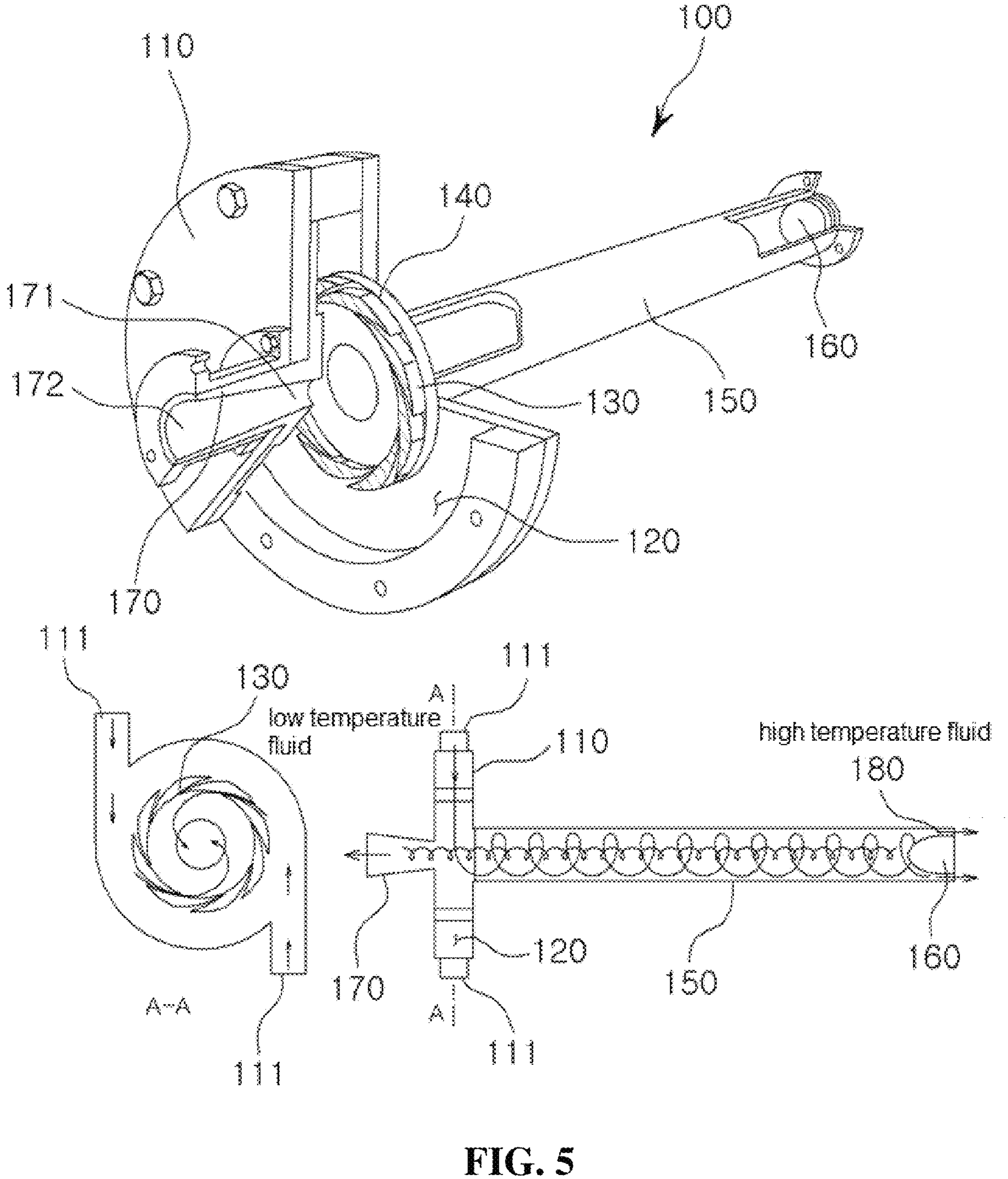
FIG. 5 shows a perspective view and cross-sectional view of a device that expands and cools a mixture of LNG fuel and hydrogen ($H_2$) in the present invention.

FIG. 3 shows a crystal structure diagram of the LNG molecule in solid phase. FIG. 4 shows a phase diagram showing the presence of hydrogen ($H_2$) in slush LNG fuel. And FIG. 5 is a perspective view and cross-sectional view of a device that expands and cools a mixture of LNG fuel and hydrogen ($H_2$) in the present invention.

In FIG. 3, "a" refers to the kinetic diameter of the molecule.

TABLE 1

| molecule's name | molecular weight | kinetic diameter (nm) |
|---|---|---|
| $CO_2$ | 44 | 33.0 |
| $O_2$ | 32 | 34.6 |
| $N_2$ | 28 | 36.4 |
| $H_2O$ | 18 | 26.5 |
| $CH_4$ | 16 | 38.0 |
| $H_2$ | 2 | 28.9 |

Table 1 presents the molecular weight and kinetic diameter for each fluid.

From Table 1, the kinetic diameter of the LNG ($CH_4$) molecule is 38 nm, and the kinetic diameter of the hydrogen ($H_2$) molecule is 28.9 nm.

When hydrogen ($H_2$) molecule enters the exact center of the LNG ($CH_4$) molecule, the closest distance of LNG ($CH_4$) molecule is 30 nm away from the hydrogen ($H_2$) molecule Therefore, the distance between the hydrogen ($H_2$) molecule and the LNG ($CH_4$) molecule is 33.5 nm. This state is shown as a conceptual diagram in FIG. 4. This is Hydrogen-enriched slush LNG fuel, which may contain hydrogen ($H_2$) molecules inside the LNG ($CH_4$) molecules. Since this Hydrogen-enriched slush LNG fuel contains more hydrogen ($H_2$) molecules inside than the original LNG fuel, it has greatly different molecular characteristics from the original LNG fuel, making it very advantageous for combustion.

FIG. 5 is a perspective view and cross-sectional view of a device for expanding and cooling a mixed fluid of LNG fuel and hydrogen ($H_2$) of the present invention.

The device is equipped with a vortex tube 110 that has a vortex chamber 120 formed inside. The mixed fluid is introduced through a plurality of radial inlets 111 installed on the outer surface of the vortex chamber. And then the mixed fluid flows into the vortex tube 110 through the inlets 111 and nozzle 130 which makes a clockwise swirl motion in conjunction with the swirl generator 140 provided inside the vortex chamber 120. At this time, the mixed fluid flowing into the swirl generator 140 causes a swirling motion from the inlet 131 to the outlet 132 of the nozzle 130.

The mixed fluid is supplied through a plurality of inlets 111 installed in the radial direction on the vortex tube 110. In this case, it is preferable that the number of inlets 111 used should be odd number, such as 5 or 7. Odd inlets result in an increase in the turning strength inside the vortex tube 110.

In this case, due to the swirl motion of the mixed fluid, a flow field is formed on one cross-section of the vortex tube 110. The pressure decreases at the center and increases toward the outside of the vortex tube on the flow field. At the same time, in the direction of the central axis of the vortex tube 110, a strong pressure gradient is formed in the axial direction of the vortex tube 110 so that the pressure decreases toward the left from the central axis of the vortex tube 110 on the flow field, but increases toward the right.

Therefore, the relatively high temperature fluid is discharged to the high temperature fluid vent 180 through the main tube 150 at the right end of the vortex tube 110. Meanwhile the low temperature fluid is discharged to the left side of the vortex tube 110 in a slush phase through low-temperature fluid vent 170. Hereby the device allows for energy separation.

A plug 160 having a smaller outer diameter than the outlet 180 is installed at the high-temperature fluid vent 180, so that the high-pressure and high-temperature fluid on the outer side of the main tube 150 is discharged between the inner surface of the outlet 180 and the outer surface of the plug 160. But the Hydrogen-enriched slush LNG fuel, which is a low-pressure and low-temperature fluid on the inner side of the main tube 150, is blocked by the plug 160 and discharged in the opposite direction to the left. Thereby, the high-temperature fluid can be separated into the low-temperature fluid of Hydrogen-enriched slush LNG fuel.

Figure 6:
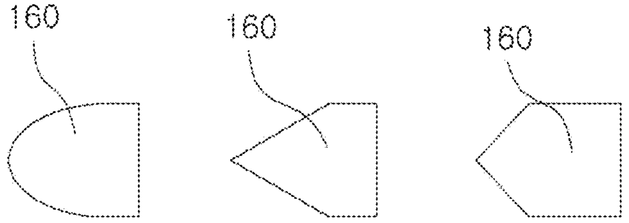
FIG. 6 shows an example diagram of the plug in FIG. 5.

As a result, the mixed fluid which is discharged from the right end of the vortex tube 110 is in a gaseous phase as shown in FIG. 1 while the mixed fluid which is discharged from the left end is in a slush phase. So hydrogen ($H_2$) molecules and LNG fuel is mixed to produce a mixed fluid and then the mixed fluid is expanded and cooled to produce Hydrogen-enriched slush LNG fuel. The outlet 170 of Hydrogen-enriched slush LNG fuel which is a low-temperature fluid, has an enlarged shape whose cross-sectional area gradually expands from the inlet 171 to the outlet 172. FIG. 6 shows the shape of the plug 160 in FIG. 5. The left side cross-section of the plug includes a gentle curvature, a triangular point with a gentle slope and a triangular point with a steep slope, etc.

Figure 7:
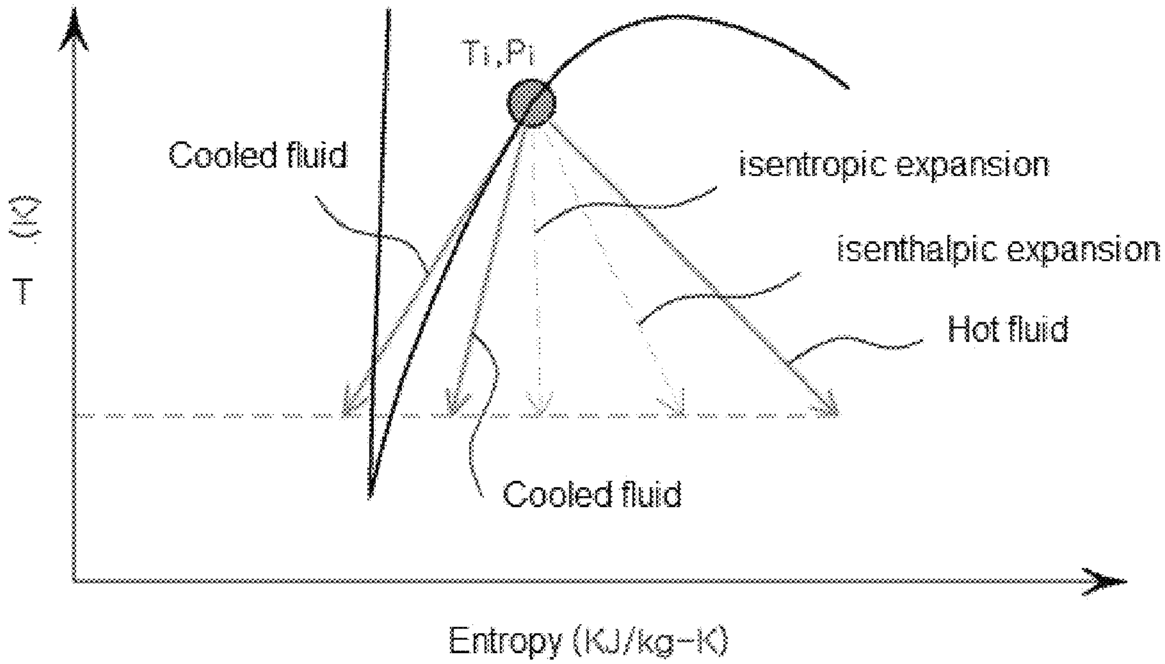
FIG. 7 shows a temperature-entropy diagram showing the energy separation process of the mixed fluid generated in the vortex if Ti and Pi are the temperature and pressure of the mixed fluid of LNG fuel and hydrogen ($H_2$) at the entry of the vortex tube of the present invention respectively.

FIG. 7 shows a temperature-entropy diagram showing the energy separation process of the mixed fluid generated in the vortex if Ti and Pi are the temperature and pressure of the mixed fluid of LNG fuel and hydrogen ($H_2$) at the entry of the vortex tube of the present invention respectively.

As shown, when the vortex tube's flow state is presumed to be an isenthalpic process and an isentropic process, the high temperature phase obtained at the right end of the vortex tube 110 is shown as a downward-right line in a flow process, and the low-temperature phase is shown as a downward-left line in a flow process.

As can be seen from the downward-right and downward-left lines, the mixed fluid flowing into the vortex tube is connected to the swirl generator 140 provided inside the vortex chamber 120 through a nozzle 130 that makes a clockwise swirl motion. When the mixed fluid flows inside the vortex chamber 120 through a nozzle 130, it can be seen that the mixed fluid is separated and discharged into the high-temperature fluid and the low-temperature fluid.

Figure 8:
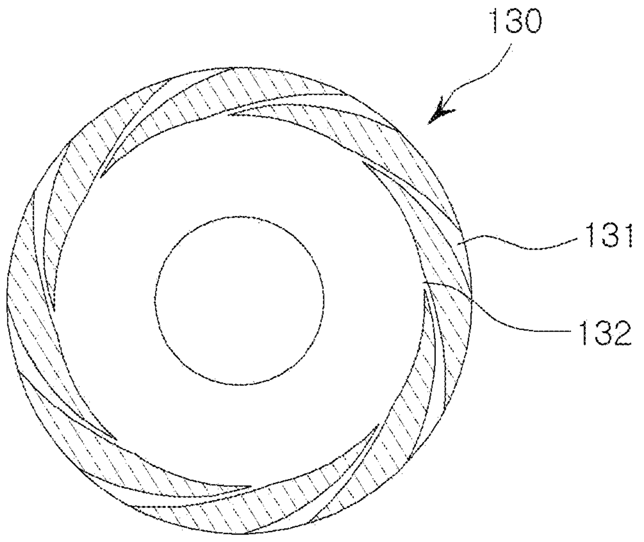
FIG. 8 shows the nozzle shape of the vortex tube in the present invention.

FIG. 8 shows the nozzle shape of the vortex tube in the present invention.

The detailed shape of the nozzle 130 is a convergent nozzle whose cross-sectional area gradually decreases from the inlet 131 to the outlet 132.

Figure 9:
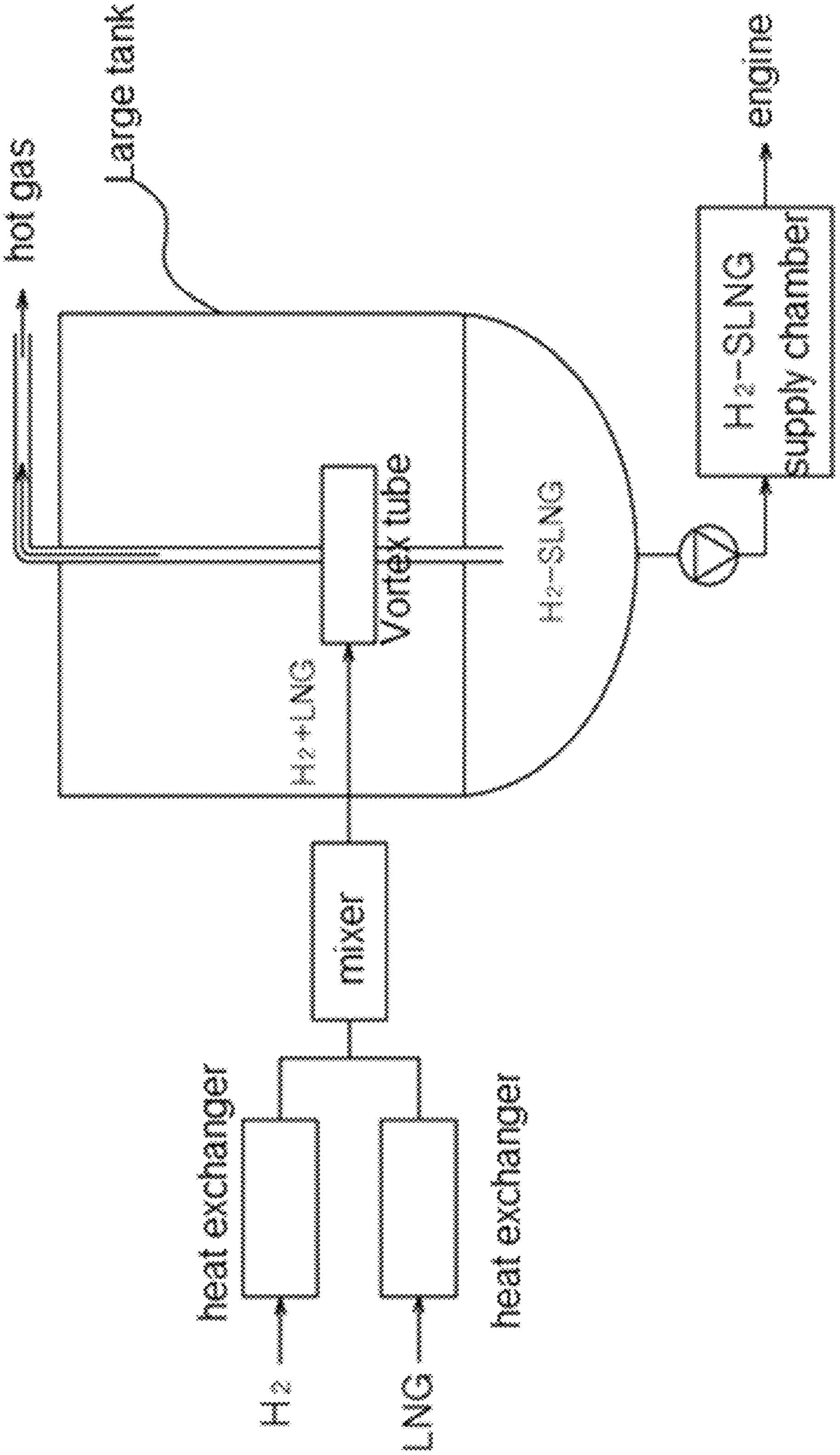
FIG. 9 shows a device used to produce the Hydrogen-enriched slush LNG fuel in the present invention.

FIG. 9 shows a device used to produce the Hydrogen-enriched slush LNG fuel in the present invention.

Gas phase hydrogen ($H_2$) and LNG are introduced into heat exchangers to secure the required initial conditions.

Gas phase hydrogen ($H_2$) and LNG that have passed through the heat exchangers are introduced into the mixer. When the initial pressure and temperature (Pi and Ti) of the mixed fluid are obtained, the mixed fluid is supplied to the inlet of the vortex tube 110.

In the present invention, the initial pressure of the mixed fluid is in the range of 20 to 30 bar and the initial temperature is 120 to 100 K.

In this case, the vortex tube 110 is installed in a large insulated tank. The gas discharged to the high temperature side can be recovered and reused after being discharged to the outside of the large tank. The hydrogen-enriched LNG fuel discharged to the bottom of the large tank can be discharged through a pump installed outside the large tank and supplied to the fuel line for engine combustion.

NUMERALS OF DRAWINGS

100: Device for expanding and cooling
110: Vortex tube
111: Vortex tube inlet
120: Vortex chamber
130: Nozzle
131: Nozzle inlet
132: Nozzle outlet
140: Swirl generator
150: Main tube
160: Plug
170: Low-temperature fluid vent
180: High temperature fluid vent

What is claimed is:

1. A device for producing Hydrogen-enriched slush Liquified Natural Gas (LNG) fuel, the device comprising:
- a vortex tube including a vortex chamber disposed inside therein, and a plurality of radial inlets installed on an outer surface of the vortex chamber through which a mixed fluid flows;
- a swirl generator provided inside the vortex chamber for the mixed fluid to flow inside the vortex tube and to cause a swirling motion; and
- a nozzle disposed on a left side of the swirl generator, wherein a flow field is formed when pressure decreases to a left direction from the central axis of the vortex tube and pressure increases in a right direction from the central axis of the vortex tube, a first fluid discharges through a main tube, to a right end of the vortex tube, and a second fluid, which is lower than the first fluid in temperature discharges through a fluid vent on a left side of the vortex tube.

2. The device of claim 1, a cross-sectional area of the nozzle has a convergent shape which is gradually reduced from an inlet to an outlet of the nozzle.

3. The device of claim 1, the plurality of radial inlets installed on the outer surface of the vortex chamber through which the mixed fluid flows is an odd number.

4. The device of claim 1, a cross-sectional area of the fluid vent has an enlarged shape which is gradually expanded from an inlet to an outlet of the vent.

5. A method of producing Hydrogen-enriched slush Liquified Natural Gas (LNG) fuel, the method comprising:
- introducing a mixture of gaseous hydrogen ($H_2$) and LNG respectively into heat exchangers to secure required initial pressure and temperature (Pi and Ti), thereby producing a mixed fluid from the mixture,
- supplying the mixed fluid to a plurality of radial inlets of a vortex tube including a vortex chamber disposed inside therein, when the required initial pressure and temperature (Pi and Ti) of the mixed fluid is obtained through heat exchangers, recovering and reusing gas discharged to a main tube from the vortex tube installed in a tank after discharging the gas to an outside of the tank, and discharging the Hydrogen-enriched slush LNG fuel to a bottom of the tank and further discharging the Hydrogen-enriched slush LNG fuel into a pump installed outside the tank, and supplying the Hydrogen-enriched slush LNG fuel to a fuel line for combustion of an engine.

6. The method of claim 5, the vortex tube is installed in the tank to separate the fluid discharged to the main tube from the fluid discharged to a fluid vent.

* * * * *